Figure 1:
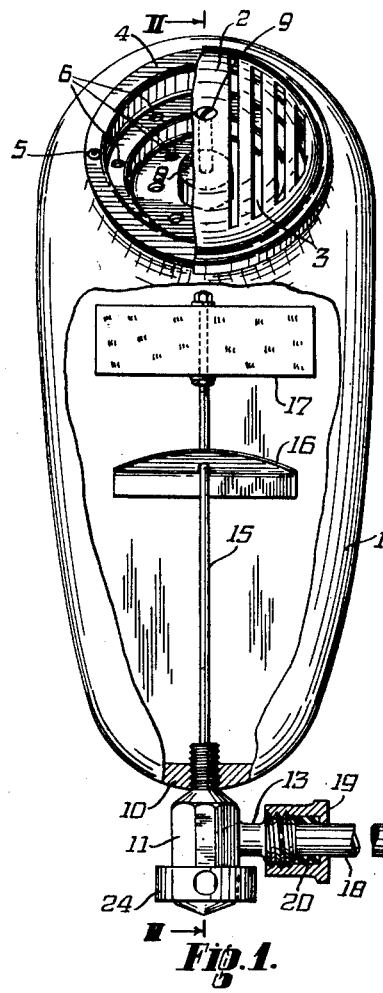

Dec. 30, 1952 H. WARD 2,623,217
APPARATUS FOR DEODORIZING THE ATMOSPHERE
Filed Dec. 22, 1950

INVENTOR.
Harold Ward
BY
Michael J. ...

Patented Dec. 30, 1952

2,623,217

UNITED STATES PATENT OFFICE 2,623,217

APPARATUS FOR DEODORIZING THE ATMOSPHERE

Harold Ward, Wilmslow, England, assignor, by mesne assignments, to Calmic Inc., New York, N. Y., a corporation of New York Application December 22, 1950, Serial No. 202,153
In Great Britain August 31, 1945

7 Claims. (Cl. 4—222)

1

The present invention relates to an improved apparatus for deodorising the atmosphere and is a continuation-in-part of my patent application Serial No. 691,903, filed August 21, 1946, now Patent Number 2,545,755, dated March 20, 1952, and entitled "Method and apparatus for deodorising the atmosphere."

An object of the present invention is to provide means whereby the atmosphere is automatically given a periodical charge of a volatile deodorant or disinfectant at times when a quantity of water is flushed through a pipe and to provide a measure of control for the quantity of charge given to the atmosphere at each flush. As will be hereinafter described a portion of the water passing through the pipe is diverted into a pump chamber to bring about the discharge of a charge of deodorant or disinfectant and is subsequently permitted to return to the pipe and it is a further object of the invention to provide means to limit the quantity of water diverted into the pump chamber so as to prevent such water coming into direct contact with the volatile deodorant or disinfectant and/or being discharged into the atmosphere therewith.

According to the present invention I provide a float in the pump chamber, a stop valve in a pipe for connecting the lower portion of said chamber to a pipe through which water is flushed, and means connecting said valve with said float to cause the valve to be closed when water in the pump chamber has caused the float to rise to a given level.

The invention will be further described with reference to the accompanying drawings which show, by way of example, one embodiment of the invention.

Figure 3:
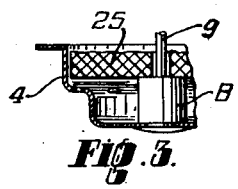
Figure 2:
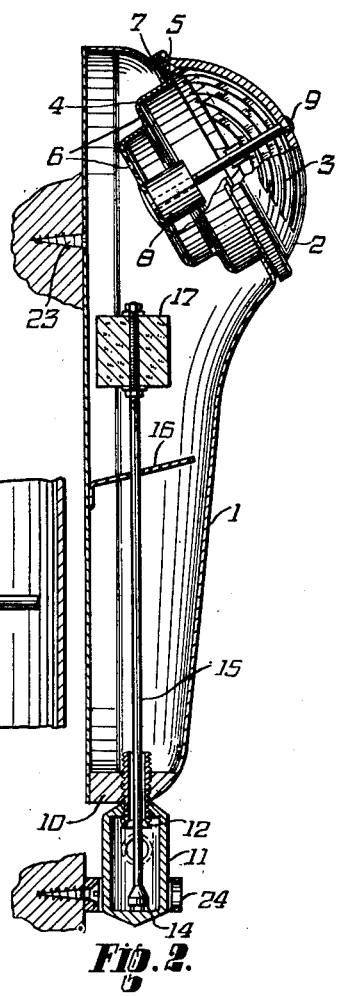

In the drawings:

Fig. 1 is a front elevation partly in section and with certain parts cut away or removed, Fig. 2 is a section along the line II—II in Fig. 1, and Fig. 3 is a detail view of a portion of the deodorant pad and basket.

A container 1 is generally vertically directed and is provided with an opening at or near its upper end closed by means of a cap 2 having a number of perforations, slits or other openings 3. A tray or basket 4 to receive a block, pad or wad 25 which may itself be of a volatile disinfectant or deodorant or made of fibrous material impregnated with a volatile disinfectant or deodorant, is provided in the upper region of the container in the region of the opening and is attached to the container by screws 5. The tray

2 or basket 4 is rendered air permeable by means such as perforations or holes 6, and a washer 7 of suitable material such as rubber may be interposed between the container 1 and the basket or tray 5 which is provided centrally with a stud 8 bored and tapped to receive cap retaining screw 9.

The lower end of the container 1 is reinforced at 10 and bored to receive valve body 11 having a valve seating 12 and a pipe connection 13. Valve plunger 14 which co-operates with valve seating 12 to form a stop valve, is disposed at the lower end of rod 15 which extends vertically from valve body 11, through valve seating 12, into container 1, through guide plate 16 and carries at its upper end float 17.

Connecting pipe 18, connected to pipe connection 13 by nut 19 and packing piece 20, serves to connect the container to an opening in a flush pipe 21 down which water is periodically flushed as from a cistern. In the arrangement shown pipe 21 has an opening through which projects scoop 22 in the form of a cut away portion of connecting pipe 18. The scoop 22 may be rotated about its own axis to vary the cross-sectional area of any vertical projection presented to water passing down the pipe 21. This variation of cross-sectional area may be achieved either by merely rotating the connecting pipe 18 through part of a revolution to rotate the scoop, or by screwing or unscrewing connecting pipe 18 so that it projects into pipe 21 to a greater or lesser degree.

The container is fixed to a suitable surface by means such as screw 23 and retaining ring 24 immediately adjacent or in the vicinity of connecting pipe 18, the scoop 22 being angled or lengthened as required.

Every time a charge of water flows down the pipe 21 a proportion of this water will pass through the scoop 22, through connecting pipe 18, valve body 11, and the stop valve into the container 1 displacing air therein and forcing it upwards through the perforations or holes 6 in tray or basket 4 and through holes or interstices in a solid block, pad or wad 25, which as hereinbefore stated may be itself a disinfectant or deodorant, or may be impregnated with a volatile disinfectant or deodorant, which block, pad or wad is suspended in tray or basket 4, and thence into the atmosphere through the openings 3 in the cap 2. As the level of water in the container rises it will come into contact with the float 17 which will then be raised therewith and thereby so that when the level of water in the container reaches a given height the float assisted by the pressure of water in connecting pipe 18 will bring about the closure of the valve by bringing valve plunger 14 into contact with valve seating 12 thereby preventing further flow of water into the container so long as water continues to flow down pipe 21. As the charge of water passing down pipe 21 becomes exhausted the pressure of water in connecting pipe 18 will be reduced and the weight of water in the container 1 will initiate opening of the valve and permit the water in the container to flow down out of the container, through the valve, the valve body 11, the connecting pipe 18 into the pipe 21, the float 17 descending with descending level of water in the container and permitting full opening of the valve. The flowing back of the water from the container causes a fresh charge of air to be drawn into the container through openings 3 in cap 2, through the solid block, pad or wad 25 in the tray or basket 4, so that the apparatus will then be in a state for a further operation on the next flushing of water through pipe 21. Thus in operation the container 1 acts as a pump chamber and the water rising and falling in the container acts as a piston within the pump chamber to expel and draw in air from and into the container. Air is drawn in past the highly volatile deodorant resulting in partial absorption of the deodorant after each periodic passage of water through the flush pipe 21 and later, during a subsequent passage of water through the flush pipe, at least part of the deodorant-containing air is forced past the highly volatile deodorant, thereby increasing its deodorant content, and is expelled through the openings in the cap into the surrounding atmosphere.

I claim:

1. An apparatus for use in conjunction with a toilet installation including a flush pipe through which a periodic supply of water is passed, said apparatus serving for deodorising the surrounding atmosphere and comprising, in combination, a vertically extending container forming a vertically extending pump chamber; at least one opening in the upper wall portion of said container communicating with the outside atmosphere so as to permit free entry and exit of air into and from said pump chamber formed within said container; a valve body formed below said container, a valve in said valve body, the interior of said valve body communicating therewith through said valve and through the lower wall portion of said container, a pipe connection in said valve body, a connecting pipe connected at one end to said pipe connection and thereby communicating with the interior of said valve body, a float in said pump chamber, said valve comprising a valve seating formed in said valve body and a valve plunger, means connecting said float with said valve plunger to bring about closure of said valve on ascent of said float to a given level; means for connecting said connecting pipe to a flush pipe in such a manner that the other end of said connecting pipe reaches into said flush pipe permitting entry of water into said connecting pipe and through same into the interior of said valve body and through said valve into said pump chamber within said container each time water is passed through said flush pipe, thereby forcing during such passage of water through said flush pipe part of said water to enter said container and rise within said pump chamber and thereby raising said float to bring about the closure of said valve when the level of water in said container has reached a given height, while permitting, after each passage of water through said flush pipe, opening of said valve to be initiated by weight of water within said container and the water which has entered said pump chamber to recede and flow back through said valve and said connecting pipe into said flush pipe; and a supply of highly volatile deodorant supported in said pump chamber within said container between said opening and said valve body so that during each receding of the water in said pump chamber after each periodic passage of water through said flush pipe air is sucked in through said opening into said pump chamber and past said highly volatile deodorant resulting in partial absorption of said deodorant by said air, while during each rise of the water in said pump chamber during each periodic passage of water through said flush pipe at least part of the deodorant-containing air in said pump chamber is forced past said highly volatile deodorant—increasing its deodorant content—and is expelled through said opening in the upper wall portion of said container, automatically deodorising the surrounding atmosphere during each passage of water through said flush pipe.

2. An apparatus of the type disclosed in claim 1 in which said supply of highly volatile deodorant consists of a fibrous pad with the deodorant absorbed by said pad.

3. An apparatus of the type disclosed in claim 1 in which said connecting pipe has a part cut away portion reaching into said flush pipe so as to force water passing through said flush pipe to enter into said connecting pipe.

4. An apparatus of the type disclosed in claim 1 in which said container is provided with a cover and the opening provided in the upper wall portion of the container is arranged in said cover.

5. A deodorizer, comprising, in combination, a hollow pump body having an at least partially open top portion; a supply of volatile deodorant mounted in said pump body adjacent to said top portion thereof; a valve connected to said pump body adjacent the bottom thereof; duct means communicating with said valve for conveying a liquid through said valve to and from the interior of said pump body; a float located in said pump body between the bottom thereof and said supply of volatile deodorant; and connecting means interconnecting said float and valve for closing the latter when the liquid level in said pump body rises to a predetermined height.

6. Deodorizing apparatus adapted to be used with a flush pipe down which water flows periodically, comprising, in combination, a hollow pump body having an at least partially open top portion; a supply of volatile deodorant mounted in said pump body adjacent to said top portion thereof; a valve connected to said pump body adjacent the bottom thereof; duct means communicating with said valve for conveying a liquid through said valve between the interior of said pump body and the flush pipe; a float located in said pump body between the bottom thereof and said supply of volatile deodorant; and connecting means interconnecting said float and valve for closing the latter when the liquid level in said pump body rises to a predetermined height.

7. A deodorizer, comprising, in combination, a hollow pump body having an at least partially open top portion; a supply of volatile deodorant mounted in said pump body adjacent to said top portion thereof; a valve connected to the bottom of said pump body, said valve comprising a valve plunger movably mounted in a valve body for movement between an upper closed position and a lower open position; duct means communicating with said valve for conveying a liquid through said valve body to and from the interior of said pump body; a float located in said pump body between the bottom thereof and said supply of volatile deodorant; and a rod interconnecting said float and valve plunger for moving the latter to said upper closed position thereof when the liquid level in said pump body rises to a predetermined height.

HAROLD WARD.

REFERENCES CITED

The following references are of record in the file of this patent:

UNITED STATES PATENTS

| Number | Name | Date |
| --- | --- | --- |
| 1,744,073 | Gordon et al. | Jan. 21, 1930 |
| 1,873,403 | Higgins | Aug. 23, 1932 |
| 2,545,755 | Ward | Mar. 20, 1951 |